United States Patent
Hanley et al.

(10) Patent No.: US 9,458,359 B2
(45) Date of Patent: Oct. 4, 2016

(54) BLOCK COPOLYMER BLEND ADHESIVES WITH MULTIPLE TACKIFIERS

(75) Inventors: Kenneth J. Hanley, Eagan, MN (US); Jay M. Jennen, Forest Lake, MN (US); James D. LaPerre, River Falls, WI (US); Gregory B. Gadbois, Woodville, WI (US); Robert D. Waid, Oakdale, MN (US); Panu K. Zoller, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/514,814

(22) PCT Filed: Nov. 15, 2007

(86) PCT No.: PCT/US2007/084833
§ 371 (c)(1),
(2), (4) Date: Dec. 28, 2009

(87) PCT Pub. No.: WO2008/073669
PCT Pub. Date: Jun. 19, 2008

(65) Prior Publication Data
US 2010/0098962 A1  Apr. 22, 2010

Related U.S. Application Data

(60) Provisional application No. 60/868,972, filed on Dec. 7, 2006.

(51) Int. Cl.
*C09J 7/02* (2006.01)
*C09J 11/06* (2006.01)
(Continued)

(52) U.S. Cl.
CPC .............. *C09J 7/0289* (2013.01); *B32B 7/12* (2013.01); *C09J 7/0221* (2013.01); *C09J 11/00* (2013.01);
(Continued)

(58) Field of Classification Search
None
See application file for complete search history.

(56) References Cited

U.S. PATENT DOCUMENTS

| 5,141,789 A | 8/1992 | Matsuzawa et al. |
| 5,292,819 A | 3/1994 | Diehl et al. |

(Continued)

FOREIGN PATENT DOCUMENTS

| EP | 0025004 | 3/1981 |
| EP | 0171225 | 2/1986 |

(Continued)

OTHER PUBLICATIONS

Handbook of Polymer Foams, David Eaves, editor, published by Shawbury, Shrewsbury, Shropshire, UK: Rapra Technology, 2004.

(Continued)

*Primary Examiner* — Frank D Ducheneaux
(74) *Attorney, Agent, or Firm* — Dena M. Ehrich; Philip Y. Dahl

(57) ABSTRACT

Pressure sensitive adhesives comprising a linear block copolymer having a rubbery block and at least one glassy block; a multi-arm block copolymer having at least three arms, each having both a rubbery block and a glassy block; a first high glass transition temperature tackifier compatible with the rubbery blocks; a second high glass transition temperature tackifier having compatible with the glassy blocks; and at least one of a low Tg tackifier, a plasticizer, and combinations thereof, are disclosed. Tapes that include such adhesive, methods of making such tapes, and bonded composites using such adhesives and tapes are also disclosed.

15 Claims, 1 Drawing Sheet

(51) Int. Cl.
  *C09J 153/02* (2006.01)
  *C08K 5/01* (2006.01)
  *B32B 7/12* (2006.01)
  *C09J 11/00* (2006.01)
  *C08K 5/00* (2006.01)

(52) U.S. Cl.
  CPC ........... *C09J 153/02* (2013.01); *C09J 153/025* (2013.01); *C08K 5/0016* (2013.01); *C08K 5/01* (2013.01); *C08L 2205/02* (2013.01); *C09J 2205/102* (2013.01); *C09J 2453/00* (2013.01); *Y10T 428/249985* (2015.04); *Y10T 428/31931* (2015.04)

(56) References Cited

U.S. PATENT DOCUMENTS

| | | | |
|---|---|---|---|
| 5,296,547 A | 3/1994 | Nestegard et al. | |
| 5,372,870 A | 12/1994 | Diehl et al. | |
| 5,393,373 A | 2/1995 | Jun et al. | |
| 5,393,787 A | 2/1995 | Nestegard et al. | |
| 5,399,627 A | 3/1995 | Diehl et al. | |
| 5,523,343 A * | 6/1996 | Giordano et al. | 524/505 |
| 5,605,964 A | 2/1997 | Groves | |
| 5,663,241 A | 9/1997 | Takamatsu et al. | |
| 5,677,376 A | 10/1997 | Groves | |
| 5,693,425 A | 12/1997 | Ma et al. | |
| 5,750,623 A | 5/1998 | Diehl et al. | |
| 5,773,506 A | 6/1998 | Nestegard et al. | |
| 5,948,527 A | 9/1999 | Gerard et al. | |
| 6,103,152 A | 8/2000 | Gehlsen et al. | |
| 6,204,350 B1 | 3/2001 | Liu et al. | |
| 6,379,791 B1 | 4/2002 | Cernohous et al. | |
| 6,503,621 B1 | 1/2003 | Ma et al. | |
| 6,579,941 B1 | 6/2003 | Sasaki et al. | |
| 6,630,531 B1 | 10/2003 | Khandpur et al. | |
| 6,632,522 B1 | 10/2003 | Hyde et al. | |
| 6,677,000 B2 | 1/2004 | Neuhaus-Steinmetz et al. | |
| H2100 H | 4/2004 | Hansen et al. | |
| 6,780,484 B2 | 8/2004 | Kobe et al. | |
| 6,805,933 B2 | 10/2004 | Patel et al. | |
| 6,835,422 B2 | 12/2004 | Kobe et al. | |
| 6,987,142 B2 | 1/2006 | St. Clair et al. | |
| 7,070,051 B2 | 7/2006 | Kanner et al. | |
| 7,078,093 B2 * | 7/2006 | Sheridan et al. | 428/343 |
| 7,084,209 B2 | 8/2006 | Everaerts et al. | |
| 2002/0045043 A1 * | 4/2002 | Kuniya et al. | 428/343 |
| 2003/0211308 A1 | 11/2003 | Khandpur et al. | |
| 2003/0215660 A1 | 11/2003 | Krawinkel et al. | |
| 2004/0082700 A1 | 4/2004 | Khandpur et al. | |
| 2004/0116582 A1 | 6/2004 | De Keyzer et al. | |
| 2004/0131846 A1 | 7/2004 | Epple et al. | |
| 2004/0229000 A1 | 11/2004 | Khandpur et al. | |
| 2005/0228114 A1 | 10/2005 | Gelles | |
| 2005/0234195 A1 | 10/2005 | St. Clair et al. | |
| 2006/0177652 A1 * | 8/2006 | Khandpur et al. | 428/343 |

FOREIGN PATENT DOCUMENTS

| | | |
|---|---|---|
| EP | 0653449 | 5/1995 |
| EP | 0711795 | 5/1996 |
| JP | 06-228522 | 8/1994 |
| JP | 08-157686 | 6/1996 |
| JP | 8-253744 | 10/1996 |
| JP | 9-53059 | 2/1997 |
| KR | 10-0235818 | 12/1999 |
| WO | WO 92/20725 | 11/1992 |
| WO | WO 97/23249 | 3/1997 |
| WO | WO 00/39233 | 7/2000 |
| WO | WO 01/51751 | 8/2001 |
| WO | WO 03/027182 | 4/2003 |
| WO | WO 2008/070386 | 6/2008 |

OTHER PUBLICATIONS

ASTM Standard D2578, (2010).

* cited by examiner

BLOCK COPOLYMER BLEND ADHESIVES WITH MULTIPLE TACKIFIERS

CROSS REFERENCE TO RELATED APPLICATIONS

This application is a national stage filing under 35 U.S.C. 371 of PCT/US2007/084833, filed Nov. 15, 2007, which claims priority to Provisional Application No. 60/868,972, filed Dec. 7, 2006, the disclosure of which is incorporated by reference in its entirety herein.

FIELD

The present disclosure relates to block copolymer-based adhesives. Particularly, pressure sensitive adhesives including a blend of block copolymers and two or more high glass transition temperature tackifiers.

BACKGROUND

Adhesives and tapes are commonly used to bond two substrates together to form a bonded composite. While a vast array of adhesives and tapes are available, advances in substrates and end use requirements continues to drive a need for new adhesive formulations and tape constructions. In addition to performance properties, environmental regulations and processing costs also influence product formulation requirements. For example, in some applications it may be desirable to use a hot melt adhesive rather than a solvent-based adhesive.

While some efforts are directed at the identification and development of new materials for use in adhesive formulations, much progress can still be made by identifying, selecting, and combining the proper proportions of existing raw materials to arrive at useful adhesives and tapes.

SUMMARY

Briefly, in one aspect, the present disclosure provides a pressure sensitive adhesive comprising a linear block copolymer and a multi-arm block copolymer. The linear block copolymer comprises a rubbery block, R, and at least one glassy block, G. The multi-arm block copolymer is of the formula $Q_n$-Y, wherein, Q represents an arm of the multi-arm block copolymer, n represents the number of arms and is a whole number of at least 3; Y is the residue of a multifunctional coupling agent. Each arm, Q, independently has the formula G-R, wherein G is a glassy block; and R is a rubbery block.

The pressure sensitive adhesives according to this aspect of the present disclosure also include a first high Tg tackifier, a second high Tg tackifier and an additional component. The first high Tg tackifier has a Tg of at least 60 degrees C., and is primarily compatible with the rubbery blocks. The second high Tg tackifier also has a Tg of at least 60 degrees C., but is primarily compatible with the glassy blocks. The additional component may be selected a low Tg tackifier, a plasticizer, or combinations thereof.

In some embodiments, a rubbery block comprises a polymerized conjugated diene, a hydrogenated derivative of a polymerized conjugated diene, or combinations thereof. In some embodiments, each of the rubbery blocks comprises a polymerized conjugated diene, a hydrogenated derivative of a polymerized conjugated diene, or combinations thereof. In some embodiments, a conjugated diene is selected from the group consisting of isoprene, butadiene, ethylene butadiene copolymers, and combinations thereof.

In some embodiments, a glassy block comprises polymerized monovinyl aromatic monomers. In some embodiments, the monovinyl aromatic monomer is selected from the group consisting of styrene, styrene-compatible blends, and combinations thereof. In some embodiments, at least one of the glassy polymer segments is selected from the group consisting of styrene, styrene-compatible blends, and combinations thereof, and, in some embodiments, each of the glassy polymer segments is selected from the group consisting of styrene, styrene-compatible blends, and combinations thereof.

In some embodiments, the linear block copolymer comprises two glassy blocks. In some embodiments, the linear block copolymer is selected from the group consisting of styrene-isoprene-styrene, styrene-butadiene-styrene, styrene-ethylene-butadiene-styrene, and combinations thereof.

In some embodiments, the multi-arm block copolymer is a star block copolymer. In some embodiments, the multi-arm block copolymer is a polymodal, asymmetric star block copolymer. In some embodiments, n is a whole number for 3 to 5, inclusive, and, in some embodiments, n is 4.

In some embodiments, the Tg of the first high Tg tackifier is at least 65 degrees C. In some embodiments, the first high Tg tackifier has a softening point of at least about 115 degrees C., and, in some embodiments, at least about 120 degrees C. In some embodiments, the first high Tg tackifier is selected from the group consisting of polymeric terpenes, hetero-functional terpenes, coumarone-indene resins, rosin acids, esters of rosin acids, disproportionated rosin acid esters, hydrogenated rosin acids, C8-C10 aromatics, partially hydrogenated C8-C10 aromatics, fully hydrogenated C8-C10 aromatics, C5/C9 aromatic modified aliphatics and blends thereof.

In some embodiments, the Tg of the second high Tg tackifier is at least 65 degrees C. In some embodiments, the second high Tg tackifier has a softening point of at least about 115 degrees C., and, in some embodiments, at least about 120 degrees C. Exemplary tackifiers that are primarily compatible with the glassy blocks include coumarone-indene resins, rosin acids, esters of rosin acids, disproportionated rosin acid esters, C9 aromatics, alpha-methyl styrene, C9/C5 aromatic-modified aliphatic hydrocarbons, and blends thereof.

In some embodiments, the component is selected from the group consisting of polybutene resins. In some embodiments, the component is selected from the group consisting of naphthenic oils, liquid polybutene resins, polyisobutylene resins, and liquid isoprene polymers.

In some embodiments, the pressure sensitive adhesive is a hot melt adhesive. In some embodiments, the pressure sensitive adhesive is a solvent-based adhesive.

In some embodiments, the ratio of the total weight of all multi-arm block polymers to the total weight of all linear block copolymers is no greater than 5.7:1, no greater than 4:1, or even no greater than 3:1. In some embodiments, this ratio is no less than 1.5:1, no less than 1.8:1, or even no less than 2:1. In some embodiments, this ratio ranges from 5.7:1 to 1.5:1, optionally from 4:1 to 1.8:1, optionally from 3:1 to 2:1.

In some embodiments, the ratio of the total weight of all block copolymers to the total weight of all high Tg tackifiers is no greater than 1.2:1, no greater than 1.15:1, or even no greater than 1.1:1. In some embodiments, this ratio is no less than 1:1.2, no less than 1:1.15, or even no less than 1:1.1. In some embodiments, this ratio ranges from 1.2:1 to 1:1.2, optionally from 1.15:1 to 1:1.15, optionally from 1.1:1 to 1:1.1.

In some embodiments, the ratio of the total weight of high Tg tackifier(s) that are primarily compatible with the rubbery blocks to the total weight of the high Tg tackifier(s) that are primarily compatible with the glassy blocks is no greater than 9:1, no greater than 4:1, or even no greater than 3:1. In some embodiments, this ratio is no less than 0.67:1, no less than 1:1, or even no less than 1.85:1. In some embodiments, this ratio ranges from 9:1 to 0.67:1, optionally from 4:1 to 1:1, optionally from 3:1 to 1.85:1.

In some embodiments, the total amount of low Tg tackifiers, plasticizers, and combinations thereof, expressed as a percent by weight (wt. %) based on the total weight of the linear block copolymer, the multi-arm lock copolymer, the first high Tg tackifier, the second high Tg tackifier, and the components selected from the group consisting of low Tg tackifiers, plasticizers, and combinations thereof, is no greater than 10 wt. %, no greater than 8 wt. %, or even no greater than 7 wt. %. In some embodiments, the total amount of these components is selected from the group consisting of no less than 2 wt %, no less than 4 wt %, and no less than 5 wt %. In some embodiments, the total amount of these components ranges from 2 to 10 wt %, optionally from 4 to 8 wt %, optionally from 5 to 7 wt %.

In another aspect, the present disclosure provides a tape comprising a foam backing having a first major surface and a second major surface. A first adhesive skin is bonded to the first major surface. The first adhesive skin comprises a first pressure sensitive adhesive, as described herein.

In some embodiments, the tape comprises a second adhesive skin bonded to the second major surface. In some embodiments, the first pressure sensitive adhesive and the second adhesive are the same adhesive. In some embodiments, the second adhesive is a pressure sensitive adhesive as described herein.

In some embodiments, the foam backing comprises a thermoplastic foam. In some embodiments, the foam backing comprises a thermoset foam. In some embodiments, the foam backing comprises an acrylic foam.

In another aspect, the present disclosure provides methods for making a tape comprising a foam backing. In some embodiments, the method comprises extruding the foam backing and coextruding the first pressure sensitive adhesive to form the first adhesive skin bonded to the first major surface of the foam backing. In some embodiments, the method further comprises extruding the second adhesive to form a second adhesive skin bonded to the second major surface of the foam backing. In some embodiments, two or more of the foam, the first pressure sensitive adhesive and the second adhesive are co-extruded.

In some embodiments, the method comprises providing the foam backing, and applying a first adhesive composition comprising the first pressure sensitive adhesive to the first surface of the foam backing, e.g., by laminating or coating. In some embodiments, the method further comprising applying a second adhesive composition to the second surface of the foam, e.g., by laminating or coating. In some embodiments, the first and/or the second adhesive composition comprise a solvent.

In yet another aspect, the present disclosure provides a bonded composite comprising a first substrate having a first surface; a second substrate having a second surface; and a bonding interface between the first surface of the first substrate to the second surface of the second substrate. In some embodiments, the bonding interface comprises a pressure sensitive adhesive as described herein. In some embodiments, the bonding interface comprises a tape as described herein. In some embodiments, the first surface has a surface energy of less than 35 dyne per centimeter.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
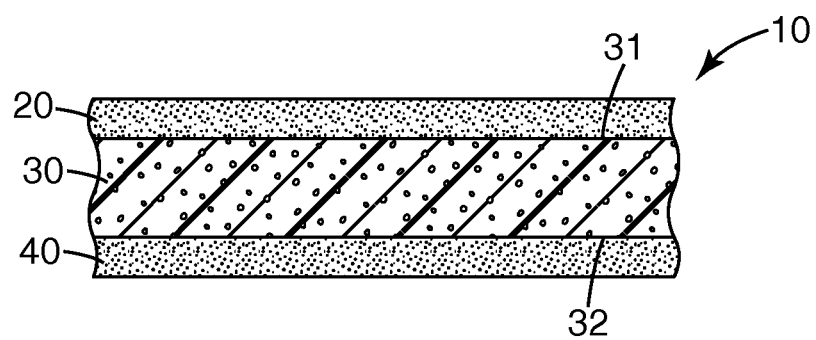
FIG. 1 illustrates a tape according to some embodiments of the present disclosure.

In one aspect, the present disclosure provides a pressure sensitive adhesive comprising both a linear block copolymer and a multi-arm block copolymer. The pressure sensitive adhesive also comprises two high glass transition temperature tackifiers. In some embodiments, the adhesives may be useful for bonding to low surface energy substrates.

The linear block copolymer can be described by the formula $$R\text{-}(G)_m$$

wherein R represents a rubbery block, G represents a glassy block, and m, the number of glassy blocks, is 1 or 2. In some embodiments, m is one, and the linear block copolymer is a diblock copolymer comprising one rubbery block and one glassy block. In some embodiments, m is two, and the linear block copolymer comprises two glassy endblocks and one rubbery midblock, i.e., the linear block copolymer is a triblock copolymer.

Generally, a rubbery block exhibits a glass transition temperature (Tg) of less than room temperature. In some embodiments, the Tg of the rubbery block is less than about 0° C., or even less than about −10° C. In some embodiments, the Tg of the rubbery block is less than about −40° C., or even less than about −60° C.

Generally, a glassy block exhibits a Tg of greater than room temperature. In some embodiments, the Tg of the glassy block is at least about 40° C., at least about 60° C., at least about 80° C., or even at least about 100° C.

In some embodiments, the rubbery block comprises a polymerized conjugated diene, a hydrogenated derivative of a polymerized conjugated diene, or combinations thereof. In some embodiments, the conjugated dienes comprise 4 to 12 carbon atoms. Exemplary conjugated dienes include butadiene, isoprene, ethylbutadiene, phenylbutadiene, piperylene, pentadiene, hexadiene, ethylhexadiene, and dimethylbutadiene. The polymerized conjugated dienes may be used individually or as copolymers with each other. In some embodiments, the conjugated diene is selected from the group consisting of isoprene, butadiene, ethylene butadiene copolymers, and combinations thereof.

In some embodiments, at least one glassy block comprises a polymerized monovinyl aromatic monomer. In some embodiments, both glassy blocks of a triblock copolymer comprise a polymerized monovinyl aromatic monomer. In some embodiments, the monovinyl aromatic monomers comprise 8 to 18 carbon atoms. Exemplary monovinyl aromatic monomers include styrene, vinylpyridine, vinyl toluene, alpha-methyl styrene, methyl styrene, dimethylstyrene, ethylstyrene, diethyl styrene, t-butylstyrene, di-n-butylstyrene, isopropylstyrene, other alkylated-styrenes, styrene analogs, and styrene homologs. In some embodiments, the monovinyl aromatic monomer is selected from the group consisting of styrene, styrene-compatible monomers or monomer blends, and combinations thereof.

As used herein, "styrene-compatible monomers or monomer blends" refers to a monomer or blend of monomers, which may be polymerized or copolymerized, that preferentially associate with polystyrene or with the polystyrene endblocks of a block copolymer. The compatibility can arise from actual copolymerization with monomeric styrene; solubility of the compatible monomer or blend, or polymerized monomer or blend in the polystyrene phase during hot melt or solvent processing; or association of the monomer or blend with the styrene-rich phase domain on standing after processing.

In some embodiments, the linear block copolymer is diblock copolymer. In some embodiments, the diblock copolymer is selected from the group consisting of styrene-isoprene, and styrene-butadiene. In some embodiments, the linear block copolymer is a triblock copolymer. In some embodiments the triblock copolymer is selected from the group consisting of styrene-isoprene-styrene, styrene-butadiene-styrene, styrene-ethylene-butadiene-styrene, and combinations thereof. Diblock and triblock copolymers are commercially available, e.g., those under the trade name VECTOR available from Dexco Polymer LP, Houston, Tex.; and those available under the trade name KRATON available from Kraton Polymers U.S. LLC, Houston, Tex. As manufactured and/or purchased, triblock copolymers may contain some fraction of diblock copolymer as well.

In some embodiments, the multi-arm block copolymer of the present disclosure has the general formula $Q_n$-Y, wherein Q represents an arm of the multi-arm block copolymer; n represents the number of arms and is a whole number of at least 3, i.e., the multi-arm block copolymer is a star block copolymer. Y is the residue of a multifunctional coupling agent. Each arm, Q, independently has the formula G-R, wherein G is a glassy block; and R is a rubbery block. In some embodiments, n ranges from 3-10. In some embodiments, n ranges from 3-5. In some embodiments, n is 4. In some embodiments, n is equal to 6 or more.

Exemplary rubbery blocks include polymerized conjugated dienes, such as those described above, hydrogenated derivatives of a polymerized conjugated diene, or combinations thereof. In some embodiments, the rubbery block of at least one arm comprises a polymerized conjugated diene selected from the group consisting of isoprene, butadiene, ethylene butadiene copolymers, and combinations thereof. In some embodiments, the rubbery block of each arm comprises a polymerized conjugated diene selected from the group consisting of isoprene, butadiene, ethylene butadiene copolymers, and combinations thereof.

Exemplary glassy blocks include polymerized monovinyl aromatic monomers, such as those described above. In some embodiments, the glassy block of at least one arm is selected from the group consisting of styrene, styrene-compatible blends, and combinations thereof. In some embodiments, the glassy block of each arm is selected from the group consisting of styrene, styrene-compatible blends, and combinations thereof.

In some embodiments, the multi-arm block copolymer is a polymodal block copolymer. As used herein, the term "polymodal" means that the copolymer comprises endblocks having at least two different molecular weights. Such a block copolymer may also be characterized as having at least one "high" molecular weight endblock, and at least one "low" molecular weight endblock, wherein the terms high and low are used relative to each other. In some embodiments the ratio of the number average molecular weight of the high molecular weight endblock, (Mn)H, relative to the number average molecular weight of the low molecular weight endblock, (Mn)L, is at least about 1.25.

In some embodiments, (Mn)H ranges from about 5,000 to about 50,000. In some embodiments, (Mn)H is at least about 8,000, and in some embodiments at least about 10,000. In some embodiments, (Mn)H is no greater than about 35,000. In some embodiments, (Mn)L ranges from about 1,000 to about 10,000. In some embodiments, (Mn)L is at least about 2,000, and, in some embodiments, at least about 4,000. In some embodiments, (Mn)L is less than about 9,000, and, in some embodiments, less than about 8,000.

In some embodiments, the multi-arm block copolymer is an asymmetric block copolymer. As used herein, the term "asymmetric" means that the arms of the block copolymer are not all identical. Generally, a polymodal block copolymer is an asymmetric block copolymer (i.e., a polymodal asymmetric block copolymer) as not all arms of a polymodal block copolymer are identical since the molecular weights of the end blocks are not all the same. In some embodiments, the block copolymers of the present disclosure are polymodal, asymmetric block copolymers. Methods of making asymmetric, polymodal block copolymers are described in, e.g., U.S. Pat. No. 5,296,547.

Generally, the multifunctional coupling agent may be any polyalkenyl coupling agent or other material known to have functional groups that can react with carbanions of the living polymer to form linked polymers. The polyalkenyl coupling agent may be aliphatic, aromatic, or heterocyclic. Exemplary aliphatic polyalkenyl coupling agents include polyvinyl and polyalkyl acetylenes, diacetylenes, phosphates, phosphites, and dimethacrylates (e.g., ethylene dimethacrylate). Exemplary aromatic polyalkenyl coupling agents include polyvinyl benzene, polyvinyl toluene, polyvinyl xylene, polyvinyl anthracene, polyvinyl naphthalene, and divinyldurene. Exemplary polyvinyl groups include divinyl, trivinyl, and tetravinyl groups. In some embodiments, divinylbenzene (DVB) may be used, and may include o-divinyl benzene, m-divinyl benzene, p-divinyl benzene, and mixtures thereof. Exemplary heterocyclic polyalkenyl coupling agents include divinyl pyridine, and divinyl thiophene. Other exemplary multifunctional coupling agents include silicon halides, polyepoxides, polyisocyanates, polyketones, polyanhydrides, and dicarboxylic acid esters.

The pressure sensitive adhesives of the present disclosure comprise at least two high Tg tackifiers, each having a glass transition temperature (Tg) of at least 60 degrees Celsius (° C.). As used herein, the terms "high glass transition temperature tackifier" and "high Tg tackifier" refers to a tackifier having a glass transition temperature of at least 60° C. In some embodiments, at least one of the high Tg tackifiers has a Tg of at least 65° C., or even at least 70° C. In some embodiments, both high Tg tackifiers have a Tg of at least 65° C., and in some embodiments, both high Tg tackifiers have a Tg of at least 70° C. In some embodiments, the first high Tg tackifier has a softening point of at least about 115° C., and, in some embodiments, at least about 120° C. In some embodiments, the second high Tg tackifier has a softening point of at least about 115° C., and, in some embodiments, at least about 120° C.

The first high Tg tackifier is primarily compatible with at least some of the rubbery blocks. In some embodiments, the first high Tg tackifier is primarily compatible with the rubbery block of the linear block copolymer and each rubbery block of a multi-arm block copolymer.

As used herein, a tackifier is "compatible" with a block if it is miscible with that block. Generally, the miscibility of a tackifier with a block can be determined by measuring the effect of the tackifier on the Tg of that block. If a tackifier is miscible with a block it will alter (e.g., increase) the Tg of that block.

A tackifier is "primarily compatible" with a block if it is at least miscible with that block, although it may also be miscible with other blocks. For example, a tackifier that is primarily compatible with a rubbery block will be miscible with the rubbery block, but may also be miscible with a glassy block.

Generally, resins having relatively low solubility parameters tend to associate with the rubbery blocks; however, their solubility in the glassy blocks tends to increase as the molecular weights or softening points of these resins are lowered. Exemplary tackifiers that are primarily compatible with the rubbery blocks include polymeric terpenes, heterofunctional terpenes, coumarone-indene resins, rosin acids, esters of rosin acids, disproportionated rosin acid esters, hydrogenated, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and blends thereof.

The pressure sensitive adhesives of the present disclosure also comprise a second high Tg tackifier that is primarily compatible with the at least one glassy block. In some embodiments, the second high Tg tackifier is primarily compatible with the glassy block(s) of the linear block copolymer. In some embodiments, the second high Tg tackifier is primarily compatible with each glassy block of the multi-arm block copolymer. Generally, a tackifier that is primarily compatible with a glassy block is miscible with the glassy block and may be miscible with a rubbery block.

Generally, resins having relatively high solubility parameters tend to associate with the glassy blocks; however, their solubility in the rubbery blocks tends to increase as the molecular weights or softening points of these resins are lowered. Exemplary tackifiers that are primarily compatible with the glassy blocks include coumarone-indene resins, rosin acids, esters of rosin acids, disproportionated rosin acid esters, C9 aromatics, alpha-methyl styrene, C9/C5 aromatic-modified aliphatic hydrocarbons, and blends thereof.

In some embodiments, the pressure sensitive adhesives of the present disclosure further comprise at least one component selected from the group consisting of a low Tg tackifier, a plasticizer, and combinations thereof. As used herein, the terms "low glass transition temperature tackifier" and "low Tg tackifier" refers to a tackifier having a glass transition temperature of less than 60° C. Exemplary low Tg tackifiers include polybutenes.

Generally, a plasticizer is compatible with one or more blocks of the linear block copolymer, and/or one or more blocks of the multi-arm block copolymer. Generally, a plasticizer that is compatible with a block will be miscible with that block and will lower the Tg of that block. Exemplary plasticizers include naphthenic oils, liquid polybutene resins, polyisobutylene resins, and liquid isoprene polymers.

In some embodiments, the ratio of the total weight of all multi-arm block copolymers to the total weight of all linear block copolymers ranges from 5.7:1 to 1.5:1. In some embodiments, this ratio is no greater than 4:1, or even no greater than 3:1. In some embodiments, this ratio is no less than 1.8:1, or even no less than 2:1.

In some embodiments, the ratio of the total weight of all block copolymers to the total weight of all high Tg tackifiers ranges from 1.2:1 to 1:1.2. In some embodiments, this ratio is no greater that 1.15:1, or even no greater than 1.1:1. In some embodiments, this ratio is no less than 1:1.15, or even no less than 1:1.1.

In some embodiments, the ratio of the total weight of high Tg tackifier(s) that are primarily compatible with the rubbery blocks to the total weight of the high Tg tackifier(s) that are primarily compatible with the glassy blocks ranges from 9:1 to 0.67:1 In some embodiments, this ratio is no greater than 4:1, and, in some embodiments, no greater than 3:1. In some embodiments, this ratio is no less than 1:1, or even no less than 1.85:1.

In some embodiments, the total amount of the components selected from the group consisting of low Tg tackifiers, plasticizers, and combinations thereof, expressed as a percent by weight (wt %) based on the total weight of the main adhesive components (i.e., the block copolymers, the high Tg tackifiers, the low Tg tackifiers and the plasticizers), is in the range of 2 to 10 wt %. In some embodiments, the total amount of these components is at least 4 wt %, and, in some embodiments, at least 5 wt % based on the total weight of the main adhesive components. In some embodiments, the total amount of these components is no greater than 8 wt %, or even no greater than 7 wt % based on the total weight of the main adhesive components.

In some embodiments, the pressure sensitive adhesive of the present disclosure is a hot melt adhesive. As used herein, a hot melt adhesive is a polymer or blended polymeric material with a melt viscosity profile such that it can be coated on a substrate or carrier in a thin layer at a process temperature significantly above normal room temperature, but retains useful pressure-sensitive adhesive characteristics at room temperature.

The pressure-sensitive adhesive compositions of the present invention can be made using methods known in the art. For example, they can be made by dissolving the block copolymers, suitable tackifiers, any plasticizer(s), and any other additives in a suitable solvent, creating a solvent-based adhesive. The adhesive may then be coated onto a substrate (e.g., release liner, tape backing, core, or panel) using conventional means (e.g., knife coating, roll coating, gravure coating, rod coating, curtain coating, spray coating, air knife coating). In some embodiments, the adhesive is then dried to remove at least some of the solvent. In some embodiments, substantially all of the solvent is removed.

In some embodiments, the pressure-sensitive adhesive is prepared in a substantially solvent-free process (i.e., the adhesive contain no greater than about 10 wt. % solvent, in some embodiments, no greater than about 5 wt. % solvent, and in some embodiments no greater than 1 wt. % solvent or even no greater than trace amounts of solvent (i.e., essentially no solvent). In some embodiments, the pressure sensitive adhesive may contain residual solvents, e.g., adhesives may be prepared in solvent, and the solvent is removed prior to subsequent processing, e.g., coating. Generally, the residual solvent is present as no greater than about 5%, in some embodiments, no greater than about 1%, or even no greater than trace amounts of solvent (i.e., essentially no solvent). Such substantially solvent-free processes are known and include, e.g., compounding by calendering or roll milling, and extruding (e.g., single. screw, twin screw, disk screw, reciprocating single screw, pin barrel single screw, etc.). Commercially available equipment such as BRABENDER or BANBURY internal mixers are also available to batch mix the adhesive compositions. After compounding, the adhesive may be coated through a die into a desired form, such as a layer of adhesive, or it may be collected for forming at a later time.

In some embodiments, solvent-based adhesives may be used. In some embodiments, such adhesives comprise at least about 20% by weight solvent, in some embodiments, at least about 40%, at least about 50%, or even at least about 60% by weight solvent. Any known method of coating and drying solvent based adhesives may be used.

In another aspect, the present disclosure provides a tape comprising a backing and a pressure sensitive skin adhesive bonded to at least one major surface of the backing. In some embodiments, the tape comprises a backing and a skin adhesive bonded to both major surfaces of the backing, wherein at least one skin adhesive is a pressure sensitive adhesive. In some embodiments, both skin adhesives are pressure sensitive adhesives. In some embodiments, both adhesives are the same adhesive. In some embodiments, the adhesives are different adhesives.

As used herein, the term "core" may be used interchangeably with the term "backing" when referring to a double-sided tape construction, i.e., a tape construction having an adhesive layer on both major surfaces of the backing or core.

At least one skin adhesive of the tapes of the present disclosure is a pressure sensitive adhesive comprising a linear block copolymer, a multi-arm block copolymer, and at least two high Tg tackifiers, as described herein. In some embodiments, both skin adhesives are pressure sensitive adhesives comprising a linear block copolymer, a multi-arm block copolymer, and at least two high Tg tackifiers, as described herein.

In some embodiments, one or more of the skin adhesive may be directly bonded to a major surface of a backing or core. In some embodiments, one or more of the skin adhesives may be indirectly bonded to a major surface of a backing or core. In some embodiments, e.g., a primer layer, may be interposed between the skin adhesive and the major surface. Useful primers are generally known and include, e.g., the primers described in U.S. Pat. No. 5,677,376 (Groves) and U.S. Pat. No. 5,605,964 (Groves).

Any known backing or core may be used. In some embodiments, a backing or core comprising a foam may be used, e.g., open cell foams or closed cell foams. In some embodiments, the foam may comprise a thermoplastic foam. In some embodiments, the foam may comprise a thermoset foam. Exemplary foams include acrylic foams, polyethylene foams, and polyurethane foams. Exemplary foams are also described in, e.g., the *Handbook of Polymer Foams*, David Eaves, editor, published by Shawbury, Shrewsbury, Shropshire, UK: Rapra Technology, 2004.

Referring to FIG. 1, exemplary tape 10, according to some embodiments of the present disclosure, comprises backing (or core) 30 and two adhesive layers. First adhesive layer 20 is bonded to first major surface 31 of backing 30, while second adhesive layer 40 is bonded to second major surface 32 of backing 30. As shown in FIG. 1, both first adhesive layer 20 and second adhesive layer 40 are directly bonded a major surface of backing 30. In some embodiments, one or both adhesive layer may be indirectly bonded to backing 30. For example, in some embodiments, one or more additional layers (e.g., primers, adhesion promoting layers, films, webs, scrims, and the like) may be interposed between the backing and an adhesive layer.

In another aspect, the present disclosure provides a bonded composite. As used herein, a bonded composite comprises a first substrate having a first major surface and a second substrate having a first major surface, wherein the first major surface of the first substrate is bonded to the first major surface of the second substrate via a bonding interface.

In some embodiments, the bonding interface comprises an adhesive layer comprising a pressure sensitive adhesive comprising a linear block copolymer, a multi-arm block copolymer, and at least two high Tg tackifiers, as described herein.

In some embodiments, the bonding interface comprises a backing having a first skin adhesive bonded to the first major surface of the backing and a second skin adhesive bonded to the second major surface of the backing. At least one of the skin adhesives comprises a pressure sensitive adhesive comprising a linear block copolymer, a multi-arm block copolymer, and at least two high Tg tackifiers, as described herein. In some embodiments, both the first skin adhesive and the second skin adhesive comprises a linear block copolymer, a multi-arm block copolymer, and at least two high Tg tackifiers, as described herein.

In some embodiments, the first substrate comprises a metal, glass, ceramic, or polymeric materials, and combinations thereof. In some embodiments, the first substrate includes a primed, painted, or polymeric surface. In some embodiments, the painted surface may comprise an automotive paint or clearcoat.

In some embodiments, the first major surface of the first major substrate is a low surface energy surface. As used herein, a low surface energy surface means a surface with a measured surface energy below approximately 35 dyne per centimeter. The surface energy of a surface may be tested according to ASTM Standard D2578. Suitable test kits include, e.g., the ACCU-DYNE surface wetability kit, available from Diversified Enterprises, Claremont, N.H.

In some embodiments, the second substrate comprises a metal, glass, ceramic, or polymeric materials, and combinations thereof. In some embodiments, the second substrate includes a primed, painted, or polymeric surface. In some embodiments, the painted surface may comprise an automotive paint or clearcoat. In some embodiments, the first major surface of the second substrate is a low surface energy surface.

In some embodiments, the backing of the bonding interface comprises a foam, e.g., an open cell foam or a closed cell foam. In some embodiments, the foam comprises a thermoplastic foam. In some embodiments, the foam comprises a thermoset foam. In some embodiments, the foam comprises an acrylic foam. In some embodiments, the foam is a flexible foam. Generally, a flexible foam is a foam which, when in sheet form, can be bent back upon itself without fracturing. Exemplary foams are described in, e.g., the Handbook of Polymer Foams, David Eaves, editor, published by Shawbury, Shrewsbury, Shropshire, UK: Rapra Technology, 2004.

Figure 2:
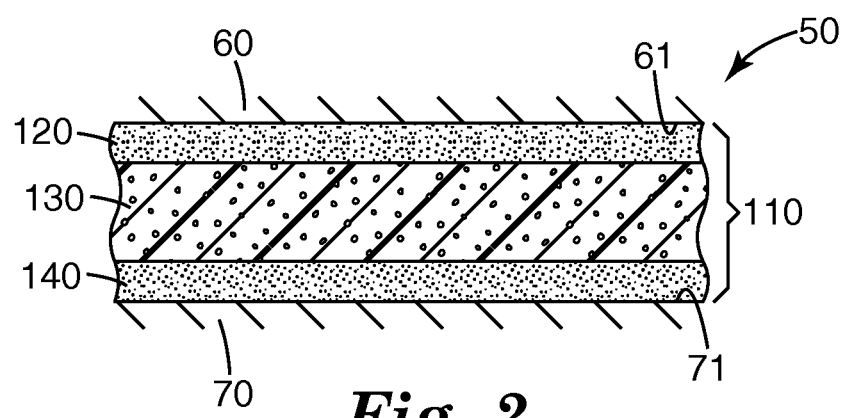
FIG. 2 illustrates a bonded composite according to some embodiments of the present disclosure.

Referring to FIG. 2, exemplary bonded composite 50, according to some embodiments of the present disclosure, comprises first substrate 60 bonded to second substrate 70 via bonding interface 110. Bonding interface 110 comprises a tape comprising backing (or core) 130 and two adhesive layers. First adhesive layer 120 is bonded to a first major surface of backing 130, while second adhesive layer 140 is bonded to a second major surface of backing 130. As shown in FIG. 2, both first adhesive layer 120 and second adhesive layer 140 are directly bonded a major surface of backing 130. In some embodiments, one or both adhesive layer may be indirectly bonded to backing 130.

As shown in FIG. 2, in some embodiments, first adhesive layer 120 is bonded directly to major surface 61 of first substrate 60. Similarly, in some embodiments, second adhesive layer 140 is directly bonded to major surface 71 of second substrate 70. In some embodiments, one or both adhesive layers may be indirectly bonded to a major surface of a substrate. For example, in some embodiments, one or more additional layers (e.g., primers, adhesion promoting layers, films, webs, scrims, and the like) may be interposed between an adhesive layer and a substrate.

In another aspect, the present disclosure provides methods of making a tape comprising a backing or a core, wherein the backing or the core comprises a foam, such as those described above. The tape comprises at least one skin adhesive, wherein at least one skin adhesive is a pressure sensitive adhesive comprising a linear block copolymer, a multi-arm block copolymer, and at least two high Tg tackifiers, as described herein.

In some embodiments, the method comprises extruding a foam. In some embodiments, the method further comprises extruding at least one skin adhesive. In some embodiments, the foam and at least one skin adhesive are co-extruded. Methods of extruding polymeric foams and methods of coextruding polymer foams and skin adhesives are described, e.g., in U.S. Pat. No. 6,103,152 (Gehlsen et al.) and U.S. Pat. No. 6,630,531 (Khandpur et al.), both of which are assigned to the present assignee, and are herein incorporated by reference in their entireties.

In some embodiments, the method of making tapes having a foam backing comprises extruding a foam backing and coextruding a first pressure sensitive adhesive as described herein to form a first adhesive skin bonded to the first major surface of the foam backing. In some embodiments, the method further comprises extruding a second adhesive to form a second adhesive skin bonded to the second major surface of the foam backing.

In some embodiments, the method of making tapes having a foam backing comprises providing the foam backing, which may have been produced by extrusion or any other known means, and applying a first adhesive composition comprising a first pressure sensitive adhesive as described herein to the first surface of the foam backing. The first adhesive composition may be applied by, e.g., laminating or coating (e.g., knife coating, roll coating, gravure coating, rod coating, curtain coating, spray coating, or air knife coating).

In some embodiments, the second adhesive may be independently extruded or co-extruded with the foam and/or the first adhesive. In some embodiments, the second adhesive may be applied to the foam backing by, e.g., laminating or coating.

In some embodiments, the first and/or second adhesive may be cured. Any known curing processes may be used, e.g., thermal curing and radiation curing. In some embodiments, one or both adhesives may crosslinked via exposure to actinic radiation, e.g., electron beam radiation or ultraviolet radiation.

The following specific, but non-limiting, examples will serve to illustrate the invention. In these examples, all percentages are parts by weight unless otherwise indicated.

TABLE 1

Summary of materials

| | | |
|---|---|---|
| AA | acrylic acid | |
| BA | butyl acrylate | |
| EA | ethyl acrylate | |
| IOA | isooctyl acrylate | |
| 2-EHA | 2-ethylhexyl acrylate | |
| IRGACURE 651 | 2,2 dimethoxy-2-phenylacetophenone | Ciba Specialty Chemicals Corp. (Tarrytown, NY) |
| IOTG | isooctyl thioglycolate | |
| KRATON 1161-D | SIS linear block copolymer (15% S, 19% diblock) | Kraton Polymers, Inc. (Houston, Texas) |
| KRATON D1107 | SIS linear block copolymer (15% S, 17% diblock) | Kraton Polymers, Inc. |
| SANTICIZER 141 | 2-ethylhexyl diphenyl phosphate | Ferro Co. (Bridgeport, New Jersey) |
| ESCOREZ 1310LC | aliphatic C-5 tackifying resin | ExxonMobil Chemical LTD. (Southampton, Hampshire, GB) |
| 4900 CMB | Black pigment having a 50/50 blend of carbon black in ethylene vinyl acetate copolymer resin having a melt index of about 150 | MA Hanna Color (Suwanee, Georgia) |
| SUPERESTER W-115 | stabilized rosin acid ester | Arakawa Chemical USA (Chicago, IL) |
| IRGANOX 1010 | Pentaerythritol tetrakis (3-(3,5-di-tert-butyl-4-hydroxyphenyl)proprionate | Ciba Specialty Chemical Co. (Tarrytown, NY) |
| TINUVIN 328 | 2-(2-hydroxy-3,5-di-(tert)-amylphenyl)benzotriazole | Ciba Special Chemicals Co. (Tarrytown, NY) |
| REGALITE R1125 | Hydrogenated hydrocarbon resin | Eastman Chemical Resins, Inc. (Kingsport, TX) |
| CUMAR 130 | Coumarone indene resin | Neville Chemical Co. (Pittsburgh, PA) |
| NYPLAST 222B | Naphthenic oil plasticizer | Nynas Naphthenics AB (Stockholm, Sweden) |
| INDOPOL H-8 | Isobutylene/Butane copolymer having number average molecular weight of 320 and polydispersity of 1.65 | BP Amoco Chemicals Co. (Naperville, IL) |

TABLE 1-continued

Summary of materials

| | | |
|---|---|---|
| INDOPOL H50 | Isobutylene/Butane copolymer having number average molecular weight of 800 and polydispersity of 1.60 | BP Amoco Chemicals Co. (Naperville, IL) |
| Piccolyte A135 Polyterpene Resin | Polymer of alpha pinene | Hercules Inc. (Wilmington, DE) |

Preparation of Acrylic Polymers

Acrylic Polymer 1 (AP-1) was prepared by mixing 45 parts of IOA; 45 parts of BA; 10 parts of AA; 0.15 part IRGACURE 651; and 0.06 part of IOTG. Discreet film packages were formed from a packaging film (0.0635 mm thick ethylene vinyl acetate copolymer film sold as VA-24 Film from CT Film, Dallas, Tex.). The AP-1 composition was sealed into the film packages, which measured approximately 10 centimeters (cm) by 5 cm by 0.5 cm thick. While immersed in a water bath maintained between about 21° C. and about 32° C., the packages were exposed to ultraviolet (UV) radiation having an intensity of about 3.5 milliWatts per square centimeter (mW/sq cm), and a total energy of about 1680 milliJoules per square centimeter (mJ/sq cm) as measured in NIST units. The method of forming the packages and curing are described in Example 1 of U.S. Pat. No. 5,804,610, the subject matter of which is incorporated herein by reference in its entirety.

Acrylic Polymer 2 (AP-2) was prepared according to the procedure for AP-1, except that 85 parts of 2-EHA; 15 parts of AA; 0.15 part IRGACURE 651 and 0.8 part IOTG were used. Similarly, Acrylic Polymer 3 (AP-3) was prepared according to the procedure for Acrylic Polymer 1 except that the composition was 95 parts of 2-EHA; 5 parts of AA; 0.15 part IRGACURE 651; and 0.03 part of IOTG. The compositions for AP-2 and AP-3 were placed in packages and exposed to UV energy, according to the procedure for AP-1.

First Skin Adhesive

Pressure-sensitive adhesives according to the compositions shown in Table 2 were compounded using a 60 mm, co-rotating twin screw extruder (available from Berstorff), (the "first adhesive extruder"). A polymodal, asymmetric star block copolymer ("PASBC") was prepared according to U.S. Pat. No. 5,393,373, the subject matter of which is hereby incorporated by reference in its entirety. The polymer had number average molecular weights of about 4,000 Dalton and about 21,500 Dalton for the two endblocks, 127,000-147,000 Dalton for the arm, and about 1,100,000 Dalton for the star measured by SEC (size exclusion chromatography) calibrated using polystyrene standards. The polystyrene content was between 9.5 and 11.5 percent by weight. The mole percentage of high molecular weight arms was estimated to be about 30%.

The polymodal asymmetric block copolymer and a linear styrene-isoprene-styrene (SIS) block copolymer (KRATON 1161-D) were dry fed into the first zone of the first adhesive extruder. Using a roll-feed extruder (available from Berstorff), either acrylic polymer AP-1 or AP-2 was heated and fed into the third zone of the first adhesive extruder. Antioxidant (IRGANOX 1010), ultraviolet light absorber (TINUVIN 328), pigmented EVA (4900 CMB) were dry fed; and (REGALITE R1125); (CUMAR 130); and (NYPLAST 222B) were melt fed in to various zones of the first adhesive extruder.

TABLE 2

First skin adhesive compositions (Weight Percent).

| | First skin adhesive | | |
|---|---|---|---|
| | ADH-1 | ADH-2 | ADH-3 |
| PASBC* | 31.80 | 33.19 | 31.80 |
| KRATON 1161-D | 13.63 | 14.23 | 13.63 |
| REGALITE R1125 | 26.98 | 32.89 | 26.98 |
| CUMAR 130 | 17.99 | 10.97 | 17.99 |
| NYPLAST 222B | 6.50 | 5.50 | 0 |
| INDOPOL H-8 | 0 | 0 | 6.50 |
| IRGANOX 1010 | 1.36 | 1.42 | 1.36 |
| TINUVIN 328 | 1.36 | 1.42 | 1.36 |
| CMB 4900 | 0.38 | 0.38 | 0.38 |

*Polymodal, asymmetric star block copolymer

Second Skin Adhesive.

A pressure sensitive adhesive was compounded in a 60 mm, co-rotating twin screw extruder (available from Berstorff) (the "second adhesive extruder") in a similar manner as described for the first skin adhesives, except that the composition was as follows: 12.70% of the polymodal, asymmetric star block copolymer (PASBC); 53.10% (by weight) AP-1; 23.30% tackifying resin (ESCOREZ 1310LC); 3.80% tackifying resin (SUPERESTER W115); 6.20% plasticizer (SANTICIZER 141); 0.26% antioxidant (IRGANOX 1010); and 0.25% ultraviolet light absorber (TINUVIN 328).

Double-Sided Foam Tape Samples.

Foam backings (FC1-FC2) having the compositions shown in Table 4 were compounded according to the following procedure. Black pigmented EVA (4900 CMB) was dry fed in to the first zone of a 90 mm, co-rotating twin screw extruder (the "backing extruder") (available from Berstorff, Hannover, Germany). Using a roll-feed extruder (available from Berstorff), both acrylic polymers AP-2 and AP-3 were heated and fed into the second zone of the backing extruder. DUALITE U010-185D expandable microspheres (expandable microspheres having a shell composition containing acrylonitrile and methacrylonitrile and a core of isopentane, available from Henkel Corporation (Gulph Mills, Pa.)) were fed into the ninth zone of the backing extruder.

TABLE 3

Foam backing compositions and properties.

| | Component Parts By Weight Percent (%) | | | | Foam Density | Thickness |
|---|---|---|---|---|---|---|
| Composition | AP-3 | AP-2 | Microspheres | Pigment | g/cm$^3$ | mm |
| FC-1 | 90.22 | 6.6 | 2.8 | 0.38 | 0.54 | 0.99 |
| FC-2 | 86.33 | 9.59 | 3.7 | 0.38 | 0.54 | 0.98 |

Three-layer co-extruded tape samples were prepared by coextruding a first skin adhesive layer, a foam backing layer as the middle layer, and a second skin adhesive layer. Examples 1-3 use exemplary adhesives according to some embodiments of the present disclosure (Adh-1 through Adh-3). The tape constructions are described in Table 5.

The second skin adhesive was compounded in the second adhesive extruder, as described above, and fed through an outer layer of a three-layer, multi-manifold film die obtained from Cloeren Inc. (Orange, Tex.). A foam backing layer was compounded in the backing extruder, as described above, and fed to the center layer of the three-layer die. A first skin adhesive was compounded in the first adhesive extruder, as described above, and fed to the outer layer of the three-layer die, opposite the second skin adhesive.

Upon exiting the die, the co-extruded layers were cast onto a silicone release coated casting roll. The roll was cooled with water having a temperature of about 12° C. The cooled extrudate was transferred from the casting roll, via a silicone release coated rubber belt, to a 0.117 mm thick, two-side silicone-coated, polyethylene release liner that was transported at the same speed as the casting roll to the end of the web transport line. The first skin adhesive was in contact with the liner after the transfer whereas the second skin adhesive was open to the air. The liner had differential release properties which allow the tape to be unrolled after winding without liner confusion. Release liners are well-known in the art, and any known release liner may be used. Typically, the release liner comprises a film or paper substrate coated with a release material. Commercially available release liners include, but are not limited to, silicone coated papers, and silicone coated films, such as polyester films. Suitable release liners are also disclosed in U.S. Pat. Nos. 6,835,422; 6,805,933; 6,780,484; and 6,204,350 assigned to 3M Innovative Properties Company.

The foam backing and both adhesive skins were cross-linked on-web using electron beam curing while supported on the liner. Two sequential irradiation steps acting on opposite faces of the tape were employed. The first skin adhesive was irradiated through the polyethylene liner, whereas the second skin adhesive was irradiated in an open-face condition. The electron beam units were curtain-type electron beam processors (such as those available under the trade designation "BROADBAND" from PCT Engineered Systems, LLC., Davenport, Iowa), operated according the acceleration voltage and dose conditions provided in Table 4.

TABLE 4

Compositions of three-layer tape samples.

| | | | First skin adhesive | | Second skin adhesive | |
|---|---|---|---|---|---|---|
| Ex. | First skin adhesive | Foam Backing | Acceleration voltage (keV) | Dose (Mrad) | Acceleration voltage (keV) | Dose (Mrad) |
| 1 | ADH-1 | FC-2 | 247 | 11.5 | 235 | 10 |
| 2 | ADH-2 | FC-3 | 245 | 11.5 | 230 | 10 |
| 3 | ADH-3 | FC-3 | 245 | 11.5 | 230 | 10 |

The cured adhesive tapes were tested for adhesion to low surface energy automotive paints according to the "Breakaway and Continuous Peel Adhesion" (BACP), METHOD described in Ford Motor Co. Specification WSB-M3G138-B. Tensile testing was carried out using an MTS Model 1122 tensile tester (MTS Systems Corp., Eden Prairie, Minn.) equipped with TestWorks 4 software programmed to calculate the breakaway load value, averaged continuous peel value, and total energy.

The test surfaces were steel panels painted with automotive paint systems comprising a base electrocoat, pigmented basecoat, and a low surface energy, carbamate-crosslinked unpigmented acrylic-based clearcoat. The experimental tapes were adhered to the clearcoat for testing. Test Surface 1 had a measured surface energy (Accu-Dyne solutions) of 33 dynes/cm, and Test Surface 2 had a measured surface energy of 32 dynes/cm.

After applying the test tape to the test surface, the samples were conditioned prior to testing. First, the samples were conditioned at room temperature for three days. Next, the samples were conditioned at 38° C. and 100% relative humidity for six days. Four samples were tested for each tape, and the average result is reported in Table 5.

TABLE 5

Breakaway Peel Adhesion Test Results

| Ex | First skin adhesive | Test surface | Breakaway Load (Newtons) | Peel (N/cm) | Total Energy (N · cm) |
|---|---|---|---|---|---|
| 1 | ADH-1 | 2 | 120.4 | 31.2 | 503 |
| 2 | ADH-2 | 2 | 88.0 | 18.5 | N/A |
| 3 | ADH-3 | 2 | 75.7 | 17.5 | 285 |
| 4 | ADH-1 | 1 | 127.5 | 50.7 | 796 |

Examples 5-6, C1-C2

Three-layer co-extruded tape samples were prepared similarly to the procedure of Example 1, with the exception of co-extruding two adhesive skin layers having the adhesive compositions (ADH-4, ADH-5, ADH-6, and ADH-7) shown in Table 6 with the FC2 foam backing as the middle layer. Both skin layers were fed from the same extruder to the outer layers of the three layer die. Samples approximately 25 cm×76 cm were cut from the adhesive web and second piece of liner applied to the open-face side of the tape, Samples were then E-beamed after approximately 3 hours dwell at ambient condition. Both sides of the test specimens were irradiated equally through the protective liners The adhesive skin tested against the automotive paint was the side of the tape originally transferred to the carrier liner from the silicone belt.

TABLE 6

First skin adhesive compositions (Weight Percent).

| Component | ADH-4 | ADH-5 | ADH-6 | ADH-7 |
|---|---|---|---|---|
| PASBC* | 26.73 | 26.73 | 26.21 | 26.82 |
| KRATON 1107 | 14.39 | 14.39 | 14.11 | 14.44 |
| Piccolyte A135 | 34.55 | 39.48 | 48.39 | 49.5 |
| SUPERESTER W115 | 14.81 | 9.87 | 0 | 0 |
| NYPLAST 222B | 5.96 | 5.96 | 0 | 6.02 |
| INDOPOL H50 | 0 | 0 | 8.06 | 0 |
| IRGANOX 1010 | 1.65 | 1.65 | 1.62 | 1.62 |
| TINUVIN 328 | 1.65 | 1.65 | 1.62 | 1.62 |
| CMB 4900 | 0.25 | 0.25 | 0 | 0 |

The adhesive tapes were tested for 90 Degree Peel Adhesion to Test Surface 1 and Test Surface 2 described above and results are shown in Table 7. A test sample was prepared by adhering a 0.5 inch×4.5 inch wide strip of the tape with the second surface against a 0.75 inch by 4.5 inch wide strip of anodized aluminum foil, and the first adhesive surface against the panel coated with the low surface energy paint described above. The laminated test assembly was rolled down using a 6.6 kg steel roller and left at room temperature for the time shown in the table before testing. The test was run on an MTS Model 1122 tensile tester (MTS Systems Corp. (Eden Prairie, Minn.) by pulling the aluminum foil and tape away from the painted panel at a 90 degree angle. Test results are recorded in pounds per 0.5 inch (lbs/0.5 in) and converted to Newtons/cm (N/cm).

TABLE 7

90 Degree Peel Adhesion Test Results

| | | 90 Degree Peel Adhesion in N/cm (lbs/0.5 inch) | | | |
|---|---|---|---|---|---|
| Ex | First skin adhesive | Test Surface 1 (20 min) | Test Surface 1 (24 hr) | Test Surface 2 (20 min) | Test Surface 2 (24 hr) |
| 5 | ADH-4 | 59.34 (16.96) | 64.59 (18.46) | 59.31 (16.95) | 62.14 (17.76) |
| 6 | ADH-5 | 65.71 (18.78) | 63.89 (18.26) | 62.25 (17.79) | 64.38 (18.4) |
| C1 | ADH-6 | 17.32 (4.95) | 31.49 (9.0) | 22.46 (6.42) | 32.79 (9.37) |
| C2 | ADH-7 | 20.01 (5.72) | 29.74 (8.5) | 21.66 (6.19) | 41.29 (11.8) |
| C3 | Commercial Product | 6.16 (1.76) | 8.92 (2.55) | 6.79 (1.94) | 9.17 (2.62) |

Various modifications and alterations of this invention will become apparent to those skilled in the art without departing from the scope and spirit of this invention.

What is claimed is:

1. A bonded composite comprising:
   a first substrate having a first surface;
   a second substrate having a second surface; and
   a bonding interface between the first surface of the first substrate and the second surface of the second substrate, wherein the bonding interface comprises a foam backing having a first major surface and a second major surface; and a first adhesive skin bonded to the first major surface, wherein the first adhesive skin comprises a first pressure sensitive adhesive comprising
   (a) a linear block copolymer of the formula R-(G)$_m$, wherein m is 1 or 2;
   (b) a multi-arm block copolymer of the formula Q$_n$-Y, wherein:
      (i) Q represents an arm of the multi-arm block copolymer and each arm independently has the formula G-R,
      (ii) n represents the number of arms and is a whole number of at least 3; and
      (iii) Y is a residue of a multifunctional coupling agent;
   wherein each R is a rubbery block consisting essentially of a polyisoprene; and each G is a glassy block comprising a polymerized monovinyl aromatic monomer;
   (c) a first high Tg tackifier having a Tg of at least 60 degrees C., wherein the first high Tg tackifier is primarily compatible with the rubbery blocks;
   (d) a second high Tg tackifier having a Tg of at least 60 degrees C., wherein the second high Tg tackifier is primarily compatible with the glassy blocks; and
   (e) a plasticizer comprising naphthenic oils,
   wherein the first surface is a painted surface or primed surface.

2. The bonded composite according to claim 1, wherein the first surface has a surface energy of less than 35 dyne per centimeter.

3. The bonded composite according to claim 1, wherein the linear block copolymer comprises two glassy blocks.

4. The bonded composite according to claim 1, wherein the first high Tg tackifier has a softening point of at least about 115 degrees C., and the second high Tg tackifier has a softening point of at least about 115 degrees C.

5. The bonded composite according to claim 1, wherein a ratio of a total weight of all multi-arm block polymers to a total weight of all linear block copolymers ranges from 5.7:1 to 1.5:1.

6. The bonded composite according to claim 1, wherein a ratio of a total weight of all block copolymers to a total weight of all high Tg tackifiers ranges from 1.2:1 to 1:1.2.

7. The bonded composite according to claim 1, wherein a ratio of a total weight of high Tg tackifier(s) that are primarily compatible with the rubbery blocks to a total weight of the high Tg tackifier(s) that are primarily compatible with the glassy blocks ranges from 9:1 to 0.67:1.

8. The bonded composite according to claim 1, wherein a total amount of the plasticizers, expressed as a percent by weight based on a total weight of the linear block copolymer, the multi-arm block copolymer, the first high Tg tackifier, the second high Tg tackifier, and the plasticizers ranges from 2 to 10 wt %.

9. The bonded composite according to claim 1 further comprising a second adhesive skin bonded to the second major surface of the foam backing.

10. The bonded composite according to claim 1, wherein the multi-arm block copolymer is a star block copolymer.

11. The bonded composite according to claim 10, wherein the multi-arm block copolymer is a polymodal, asymmetric star block copolymer.

12. The bonded composite according to claim 10, wherein a ratio of a total weight of all multi-arm block polymers to a total weight of all linear block copolymers ranges from 5.7:1 to 1.5:1.

13. The bonded composite according to claim 10, wherein a ratio of a total weight of all block copolymers to a total weight of all high Tg tackifiers ranges from 1.2:1 to 1:1.2.

14. The bonded composite according to claim 10, wherein a ratio of a total weight of high Tg tackifier(s) that are primarily compatible with the rubbery blocks to a total weight of the high Tg tackifier(s) that are primarily compatible with the glassy blocks ranges from 9:1 to 0.67:1.

15. The bonded composite according to claim 10, wherein a total amount of the plasticizers, expressed as a percent by weight based on a total weight of the linear block copolymer, the multi-arm block copolymer, the first high Tg tackifier, the second high Tg tackifier, and the plasticizers ranges from 2 to 10 wt %.

* * * * *

UNITED STATES PATENT AND TRADEMARK OFFICE
CERTIFICATE OF CORRECTION

PATENT NO. : 9,458,359 B2
APPLICATION NO. : 12/514814
DATED : October 4, 2016
INVENTOR(S) : Kenneth Hanley et al.

Page 1 of 1

It is certified that error appears in the above-identified patent and that said Letters Patent is hereby corrected as shown below:

In the Specification

Column 10
Line 34, delete "wetability" and insert -- wettability --

Columns 11-12
Line 27, Table 1, delete "proprionate" and insert -- propionate --

Signed and Sealed this
Sixth Day of June, 2017

Michelle K. Lee
*Director of the United States Patent and Trademark Office*